United States Patent
Nakano et al.

(10) Patent No.: US 9,633,284 B2
(45) Date of Patent: Apr. 25, 2017

(54) IMAGE PROCESSING APPARATUS AND IMAGE PROCESSING METHOD OF IDENTIFYING OBJECT IN IMAGE

(71) Applicant: CANON KABUSHIKI KAISHA, Tokyo (JP)

(72) Inventors: Shunsuke Nakano, Kawasaki (JP); Hiroshi Sato, Kawasaki (JP); Yuji Kaneda, Kawasaki (JP); Takashi Suzuki, Tokyo (JP); Atsuo Nomoto, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 106 days.

(21) Appl. No.: 14/547,929

(22) Filed: Nov. 19, 2014

(65) Prior Publication Data
US 2015/0146991 A1    May 28, 2015

(30) Foreign Application Priority Data
Nov. 28, 2013    (JP) .................................. 2013-246671

(51) Int. Cl.
*G06K 9/68* (2006.01)
*G06K 9/00* (2006.01)

(52) U.S. Cl.
CPC ....... *G06K 9/6807* (2013.01); *G06K 9/00288* (2013.01)

(58) Field of Classification Search
CPC ........... G06K 9/00302; G06K 9/00248; G06K 9/00281; G06K 9/6807; G06K 9/00288
See application file for complete search history.

(56) References Cited

U.S. PATENT DOCUMENTS 4,853,771 A * 8/1989 Witriol ................... B25J 9/1697
                                                        235/375
4,891,767 A * 1/1990 Rzasa ..................... B25J 9/1697
                                                        382/151

(Continued)

FOREIGN PATENT DOCUMENTS

JP    2007-128262 A     5/2007
JP       4803214 B2    10/2011

OTHER PUBLICATIONS

T.F. Cootes et al., "Active Shape Models—Their Training and Application", 1998.

(Continued)

*Primary Examiner* — Chan Park
*Assistant Examiner* — Mia M Thomas
(74) *Attorney, Agent, or Firm* — Fitzpatrick, Cella, Harper & Scinto (57) ABSTRACT

The degree of similarity between corresponding local feature amounts out of a plurality of local feature amounts of the object in the input image and a plurality of local feature amounts of an object in an image registered in advance is obtained. At least one degree of similarity is selected out of the obtained degrees of similarity based on a capturing condition for the object in the input image and a capturing condition for the object in the registered image, and one degree of similarity is derived from the at least one selected degree of similarity. It is determined based on the one derived degree of similarity whether the object in the input image belongs to the same category as the object in the registered image.

16 Claims, 8 Drawing Sheets

(56) References Cited

U.S. PATENT DOCUMENTS

| | | | |
|---|---|---|---|
| 5,760,346 A | 6/1998 | Kobayashi et al. | |
| 5,761,087 A | 6/1998 | Yoshimura et al. | |
| 5,862,049 A | 1/1999 | Sato et al. | |
| 5,943,476 A * | 8/1999 | Dougherty | B25J 9/1694 700/251 |
| 6,225,986 B1 | 5/2001 | Sato et al. | |
| 6,239,792 B1 | 5/2001 | Yanagisawa et al. | |
| 6,278,906 B1 * | 8/2001 | Piepmeier | B25J 9/1607 700/245 |
| 6,288,711 B1 | 9/2001 | Tanaka et al. | |
| 6,611,258 B1 | 8/2003 | Tanaka et al. | |
| 6,671,391 B1 * | 12/2003 | Zhang | G06K 9/00228 382/118 |
| 7,532,745 B2 * | 5/2009 | Inoue | G06K 9/00221 382/118 |
| 7,881,524 B2 | 2/2011 | Matsugu et al. | |
| 8,130,281 B2 | 3/2012 | Kaneda et al. | |
| 8,331,655 B2 | 12/2012 | Sato et al. | |
| 8,515,136 B2 | 8/2013 | Mori et al. | |
| 8,527,439 B2 | 9/2013 | Torii et al. | |
| 8,624,994 B2 | 1/2014 | Kaneda et al. | |
| 8,626,782 B2 | 1/2014 | Sato | |
| 8,761,459 B2 | 6/2014 | Kaneda et al. | |
| 8,781,235 B2 | 7/2014 | Suzuki et al. | |
| 8,787,629 B2 | 7/2014 | Kaneda et al. | |
| 8,942,436 B2 | 1/2015 | Mori et al. | |
| 9,471,979 B2 * | 10/2016 | Sato | G06T 7/0024 |
| 2002/0103574 A1 * | 8/2002 | Funada | G06K 9/00288 700/245 |
| 2004/0218916 A1 * | 11/2004 | Yamaguchi | G03B 17/53 396/263 |
| 2005/0197923 A1 * | 9/2005 | Kilner | G06K 9/00221 382/118 |
| 2007/0098231 A1 * | 5/2007 | Minato | G06K 9/00281 382/118 |
| 2007/0195174 A1 * | 8/2007 | Oren | H04N 5/232 348/222.1 |
| 2008/0118156 A1 * | 5/2008 | Okada | G06K 9/00228 382/195 |
| 2008/0260212 A1 * | 10/2008 | Moskal | A61B 5/1079 382/118 |
| 2008/0273761 A1 * | 11/2008 | Kawata | G06K 9/00281 382/115 |
| 2009/0273667 A1 * | 11/2009 | Nozaki | H04N 5/232 348/77 |
| 2010/0189358 A1 * | 7/2010 | Kaneda | G06K 9/00744 382/195 |
| 2010/0322517 A1 * | 12/2010 | Kobayashi | G06T 7/0071 382/173 |
| 2010/0328682 A1 * | 12/2010 | Kotake | G06T 7/0057 356/620 |
| 2011/0007176 A1 * | 1/2011 | Hamano | H04N 5/23212 348/222.1 |
| 2011/0158540 A1 | 6/2011 | Suzuki et al. | |
| 2011/0206274 A1 * | 8/2011 | Tateno | G06T 7/0046 382/154 |
| 2012/0148100 A1 * | 6/2012 | Kotake | G06T 7/0046 382/103 |
| 2012/0262455 A1 * | 10/2012 | Watanabe | G06T 7/0046 345/420 |
| 2013/0010070 A1 * | 1/2013 | Tateno | G01B 11/002 348/46 |
| 2013/0011018 A1 * | 1/2013 | Tateno | G01B 11/002 382/106 |
| 2013/0051662 A1 * | 2/2013 | Shiozaki | G06K 9/00228 382/159 |
| 2013/0108116 A1 * | 5/2013 | Suzuki | G01B 11/002 382/106 |
| 2013/0142401 A1 | 6/2013 | Nomoto et al. | |
| 2013/0142426 A1 | 6/2013 | Kaneda et al. | |
| 2014/0056509 A1 | 2/2014 | Nakashima et al. | |
| 2015/0278580 A1 * | 10/2015 | Sato | G06T 7/0024 382/118 |

OTHER PUBLICATIONS

T. Ahonen et al., "Face Recognition with Local Binary Patterns", 1994.

Y. Li et al., "Support vector machine based multi-view face detection and recognition", 2004.

N. Dalal et al., "Histograms of Oriented Gradients for Human Detection", 2005.

* cited by examiner

LOCAL-DEGREE-OF-SIMILARITY GROUP 1
 LOCAL-DEGREE-OF-SIMILARITY GROUP 2

IMAGE PROCESSING APPARATUS AND IMAGE PROCESSING METHOD OF IDENTIFYING OBJECT IN IMAGE

BACKGROUND OF THE INVENTION

Field of the Invention

The present invention relates to a technique of identifying an object in an image.

Description of the Related Art

There have been proposed many techniques of comparing input image data with image data registered in advance so as to identify a category registered in advance to which an object expressed by the input image data belongs. A detailed example of such object identification is personal authentication. This technique identifies a person using a feature such as a face or fingerprint unique to the individual, and is called face authentication or fingerprint authentication. Categories in personal authentication are a name and an ID capable of specifying an individual. In object identification including personal authentication, the image of each object to be identified needs to be registered in advance as a registered image together with a name or ID before implementation of identification. Identification can actually be implemented after the registration. When the image (to be referred to as an input image hereinafter) of an object to be identified is input, it is compared with each of registered images registered in advance. If a registered image matches the input image, a registered object corresponding to the registered image is output as an identification result. If none of the registered images matches the input image, "no-object found" is output. In this specification, identifying the category of an object will mean determining the difference between the individuals of objects (for example, the difference between persons) hereinafter.

As a considerable technical method of identifying a person from a facial image, the pixels of the facial image itself are defined as feature amounts and directly compared with each other. In this method, however, variations in the pixel values depending on the orientation and expression of the face and the illumination condition are larger than those depending on the difference between persons, and it is difficult to identify the person. To solve this problem, there have been proposed a number of methods of extracting only a plurality of local regions representing features of an individual from a facial image and comparing corresponding local regions with each other. However, even with this method, it is difficult to completely remove the above-described variations, and local regions that are useful for identification and those that are not are formed. To select only the local regions useful for identification, there have been proposed methods of, for example, selecting a predetermined number of local regions in descending order of the degree of similarity obtained as a result of comparison of corresponding local regions between images (for example, Japanese Patent No. 4803214).

The technique disclosed in Japanese Patent No. 4803214 selects a predetermined number of local regions in descending order of the degree of similarity out of the degrees of similarity of a plurality of local regions. This is based on a concept that only local regions without variations, that is, having high degrees of similarity in an image are used. However, the optimum number of local regions that should be used varies depending on the degree of variation in the shooting condition between images. If the shooting conditions are close, the variation is small, and a larger number of local regions are desired to be used. If the shooting conditions are different, a smaller number of local regions are desired to be used.

SUMMARY OF THE INVENTION

The present invention has been made in consideration of the above-described problems, and provides an object identification technique considering a variation in the shooting condition of an image.

According to the first aspect of the present invention, there is provided an image processing apparatus for identifying an object in an input image, comprising: a calculation unit configured to obtain a degree of similarity between corresponding local feature amounts out of a plurality of local feature amounts of the object in the input image and a plurality of local feature amounts of an object in an image registered in advance; a derivation unit configured to select at least one degree of similarity out of the degrees of similarity obtained by the calculation unit based on a capturing condition for the object in the input image and a capturing condition for the object in the registered image and derive one degree of similarity from the at least one selected degree of similarity; and a determination unit configured to determine based on the one degree of similarity derived by the derivation unit whether the object in the input image belongs to the same category as the object in the registered image.

According to the second aspect of the present invention, there is provided an image processing method performed by an image processing apparatus for identifying an object in an input image, comprising: a calculation step of obtaining a degree of similarity between corresponding local feature amounts out of a plurality of local feature amounts of the object in the input image and a plurality of local feature amounts of an object in an image registered in advance; a derivation step of selecting at least one degree of similarity out of the degrees of similarity obtained in the calculation step based on a capturing condition for the object in the input image and a capturing condition for the object in the registered image and deriving one degree of similarity from the at least one selected degree of similarity; and a determination step of determining based on the one degree of similarity derived in the derivation step whether the object in the input image belongs to the same category as the object in the registered image.

Further features of the present invention will become apparent from the following description of exemplary embodiments with reference to the attached drawings.

DESCRIPTION OF THE EMBODIMENTS

The embodiments of the present invention will now be described with reference to the accompanying drawings. Note that the embodiments to be described below are examples of detailed implementation of the present invention or detailed examples of the arrangement described in the appended claims.

First Embodiment

In this embodiment, face authentication that identifies a human face as an object and individual persons as the categories of objects from an input image will be exemplified. Additionally, in this embodiment, the difference between face orientations in the depth direction will be exemplified as the difference between the capturing conditions of objects. An example of the functional arrangement of an object identification apparatus 1000 that functions as an image processing apparatus according to this embodiment will be described first with reference to the block diagram of FIG. 1.

Figure 1:
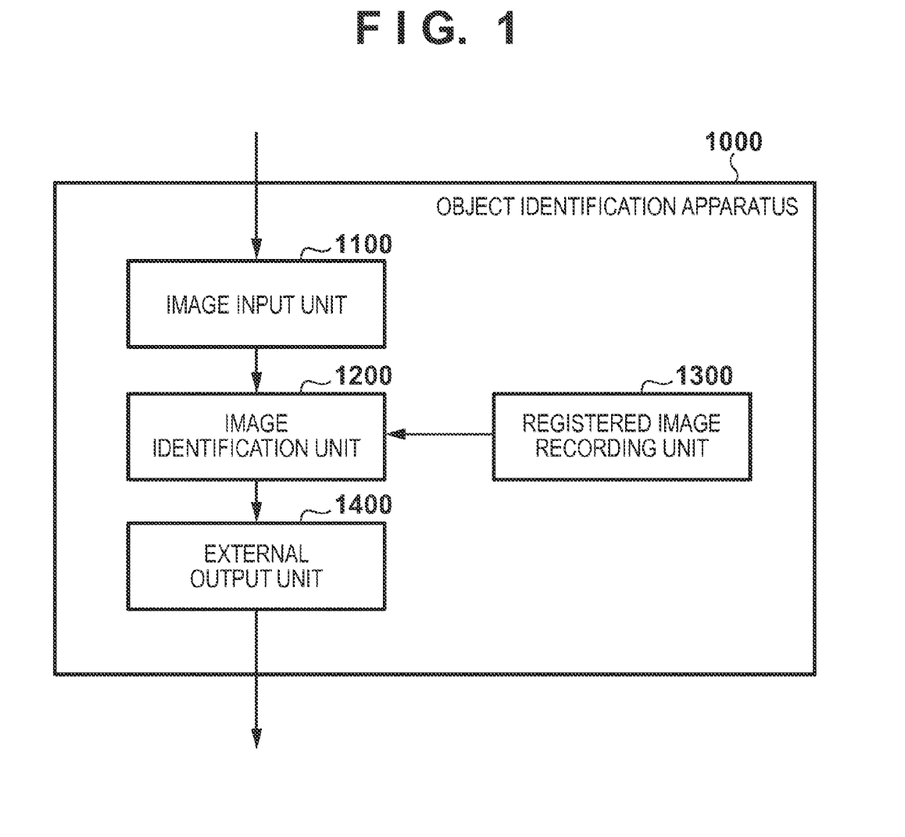
FIG. 1 is a block diagram showing an example of the functional arrangement of an object identification apparatus 1000.

An image input unit 1100 is a unit configured to input an image to the object identification apparatus 1000. The image input unit 1100 can be an image capturing apparatus including an optical lens and a video sensor or a readable semiconductor memory for holding images. The image input unit 1100 may be a unit configured to input one image to the apparatus or a unit configured to sequentially input continuous frame images to the apparatus. The image input unit 1100 may be a unit configured to input one of a still image and a movie decided by a user operation or the like to the apparatus, as a matter of course.

An image identification unit 1200 is a unit configured to perform processing of identifying an object in an image input by the image input unit 1100. The image identification unit 1200 can be formed from hardware of a dedicated circuit (ASIC) and a processor (reconfigurable processor, DSP, CPU, or the like) or implemented by programs executed in a single dedicated circuit and a general-purpose circuit (CPU for PC).

A registered image recording unit 1300 stores a plurality of images each including at least one object as registered images. These registered images are, for example, images input to the apparatus by the image input unit 1100. The registered image recording unit 1300 is, for example, a repetitively rewritable semiconductor memory. Note that the registered image recording unit 1300 is required to have a storage capacity enough to store several tens or more registered images. However, the capacity may be enough to store only registered images to be currently used by the image identification unit 1200. In this case, the registered image recording unit 1300 appropriately downloads only images to be currently used by the image identification unit 1200 from another memory device that holds a sufficient number of registered images.

An external output unit 1400 outputs the identification result of the image identification unit 1200 or, in this embodiment, information representing a category to which an object in an image belongs to the outside in an appropriate form. The external output unit 1400 is typically a monitor such as a CRT or a TFT liquid crystal display, and displays an image acquired from the image input unit 1100 or the identification result of the image identification unit 1200 on the image.

Additionally, the external output unit 1400 may output various kinds of information such as an image acquired from the image input unit 1100 and the identification result of the image identification unit 1200 to an external device or print the various kinds of information on a printing medium such as paper. Note that the output forms are not limited to those described above, and a plurality of functional units may further be used simultaneously.

Object identification processing performed by the object identification apparatus 1000 when an input image including a human face as an object is input to it will be described next with reference to FIG. 2 that illustrates the flowchart of the processing.

In step S1101, the image input unit 1100 inputs one image to the apparatus as an input image. The input image can be each frame of a movie or one still image.

In step S1102, the image identification unit 1200 extracts, as a facial image, an image in a region including an object, that is, an image in a region including a human face here from the input image input to the apparatus by the image input unit 1100.

In step S1103, it is determined whether a face has been extracted from the image. If no facial image has been extracted from the input image because, for example, the input image includes no human face or human face recognition has failed, the process returns to step S1101 to acquire the next input image. If a facial image has been extracted from the input image, the process advances to step S1104.

In step S1104, the image identification unit 1200 determines the category of the face included in the facial image using the facial image and registered images stored in the registered image recording unit 1300.

In step S1105, the image identification unit 1200 determines whether the processing of step S1104 has been done for all facial images extracted from the input image. Upon determining that the processing of step S1104 has been done for all facial images extracted from the input image, the process returns to step S1101. If a facial image (unprocessed facial image) that has not yet become the subject of the processing of step S1104 still remains out of the facial images extracted from the input image, the process returns to step S1104, and the processing of step S1104 is performed for the unprocessed facial image.

Note that the series of processes is executed in real time, and the result of identification processing (category determination result) of step S1104 can be output to the external output unit 1400 in real time. Alternatively, the external output unit 1400 may output the result of identification processing of step S1104 every time the processing of step S1104 is performed, or output, for each image, the identification result of each of one or more objects identified from the image.

Figure 2:
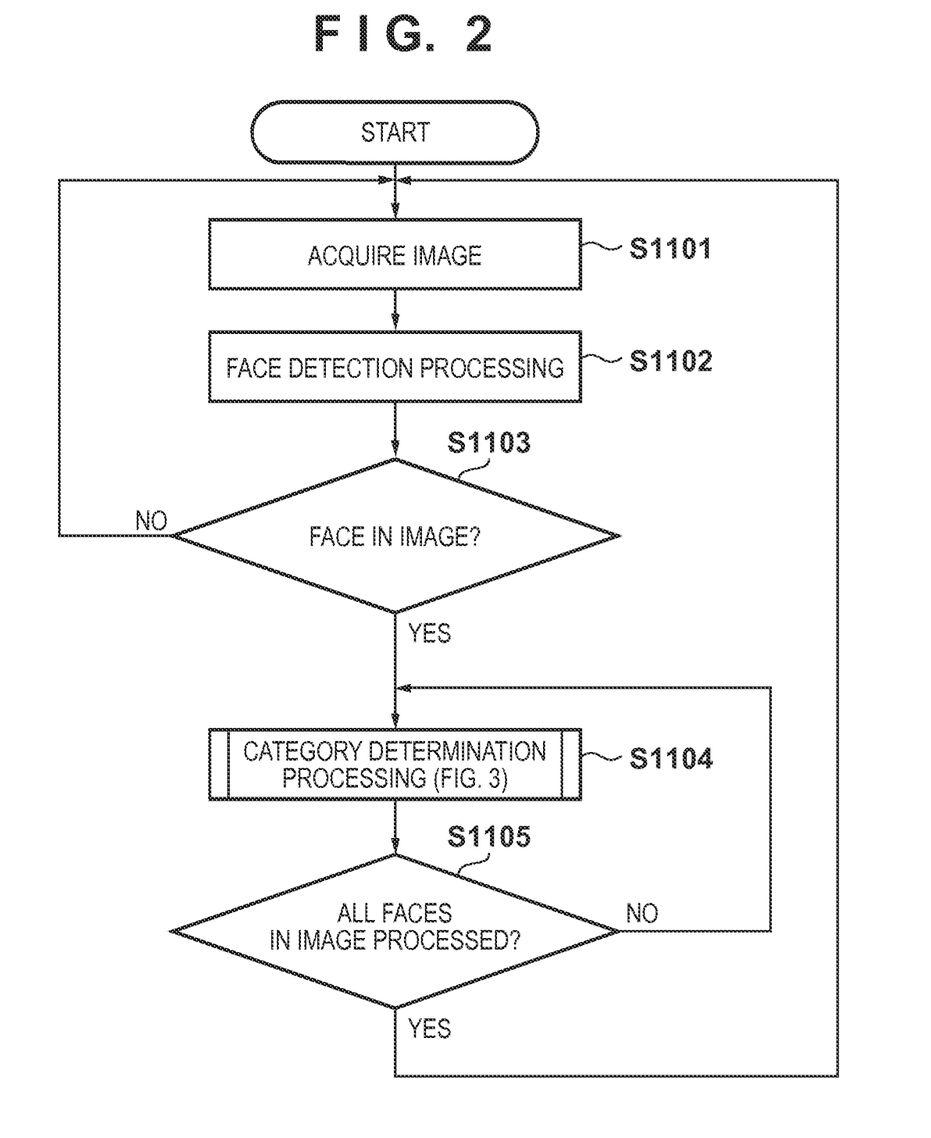
FIG. 2 is a flowchart of processing to be performed by the object identification apparatus 1000.

The end of the series of processes is not mentioned in FIG. 2. For example, the user may input an end instruction by operating an operation unit (not shown), and the control unit of the apparatus may detect the end instruction and end the processing of FIG. 2.

Figure 3:
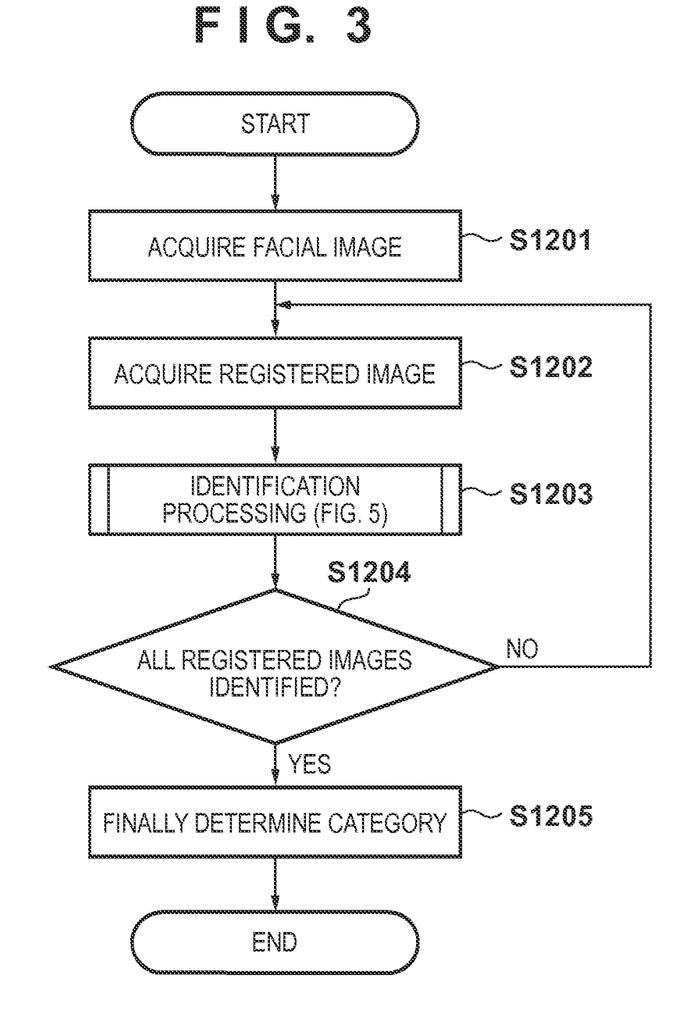
FIG. 3 is a flowchart of category determination processing.

Category determination processing of step S1104 will be described next with reference to the flowchart of FIG. 3. In step S1201, the image identification unit 1200 inputs the facial image extracted in step S1102. If a plurality of facial images are extracted in step S1102, one unselected facial image is selected and input.

In step S1202, the image identification unit 1200 selects and acquires one unselected registered image from the registered image recording unit 1300.

In step S1203, the image identification unit 1200 performs identification processing of obtaining the degree of similarity (representing the likelihood (degree) that the faces belong to the same person) between a face in the facial image acquired in step S1201 and a face in the registered image acquired in step S1202.

In step S1204, the image identification unit 1200 determines whether a registered image that has not yet been selected in step S1202 remains. Upon determining that an unselected registered image remains, the process returns to step S1202. If no unselected registered image remains, the process advances to step S1205.

In step S1205, the image identification unit 1200 specifies the highest one of the degrees of similarity obtained for the registered images stored in the registered image recording unit 1300. The image identification unit 1200 compares the highest degree of similarity with a predetermined threshold. If the highest degree of similarity is equal to or higher than the threshold, a "category to which the registered image belongs", which is associated with the registered image of which the highest degree of similarity is obtained, is determined as the category to which the face in the facial image input in step S1201 belongs. Note that if the highest degree of similarity is lower than the threshold, it is determined that there is no category to which the face in the facial image belongs. The determination result is notified to the external output unit 1400.

The "predetermined threshold" is adjusted in advance in accordance with the purpose. If the threshold is low, the possibility that a registered person can be recognized increases. However, the possibility that even an unregistered person is recognized as one of the registered persons also increases. Conversely, when the threshold is raised, the possibility that an unregistered person is erroneously recognized decreases. However, the possibility that a registered person cannot be recognized increases.

Figure 4:
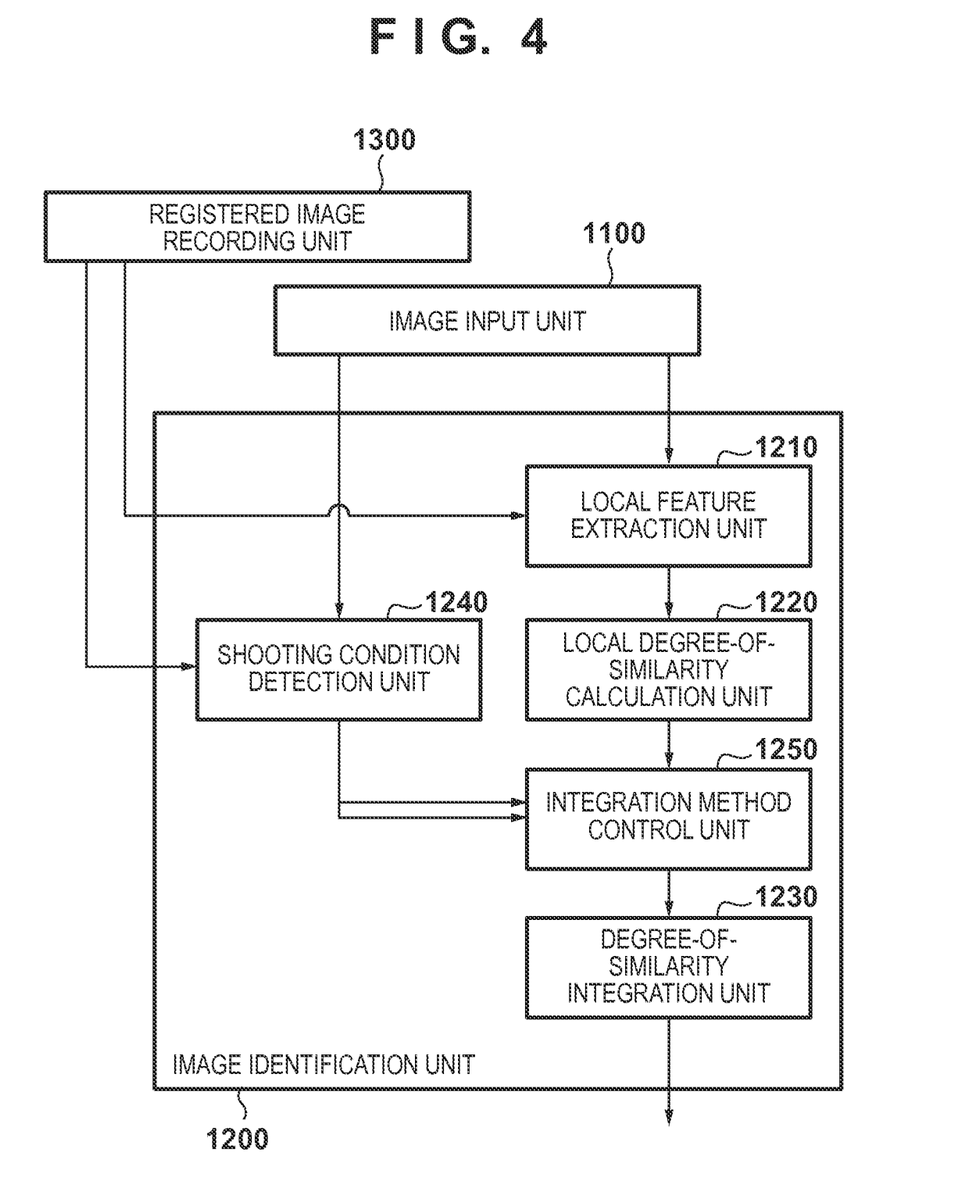
FIG. 4 is a block diagram showing an example of the functional arrangement of an image identification unit 1200.
Figure 5:
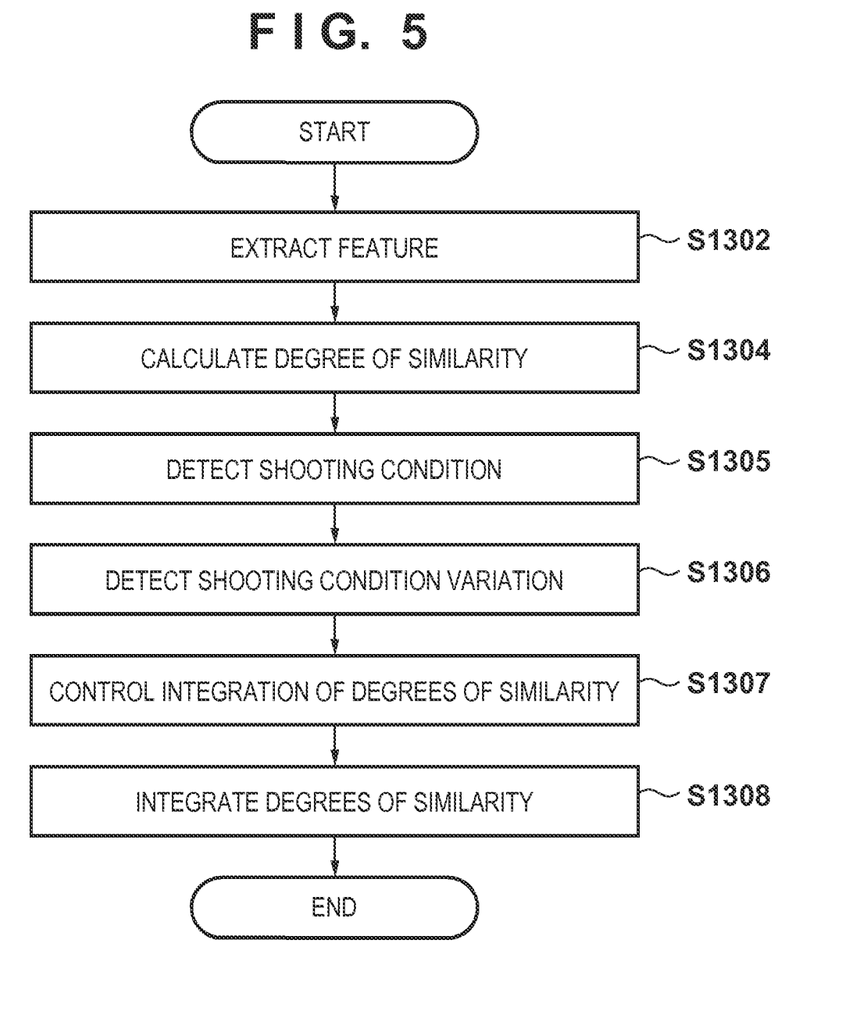
FIG. 5 is a flowchart of identification processing.

Identification processing of step S1203 will be described with reference to the flowchart of FIG. 5. FIG. 4 shows an example of the functional arrangement of the image identification unit 1200. The functions of functional units shown in FIG. 4 will be mentioned in the explanation of the flowchart of FIG. 5.

A local feature extraction unit 1210 extracts a facial image from an input image in step S1102, inputs the facial image in step S1201, and extracts a plurality of local feature amounts from the facial image in step S1302. The local feature extraction unit 1210 also acquires a registered image (selected registered image) in step S1202, extracts a facial image from the selected registered image, and extracts a plurality of local feature amounts from the facial image in step S1302.

In step S1304, a local degree-of-similarity calculation unit 1220 obtains the degree of similarity (local degree of similarity) between corresponding local feature amounts out of the plurality of local feature amounts extracted from (the facial image in) the input image and the plurality of local feature amounts extracted from (the facial image in) the selected registered image.

In step S1305, a shooting condition detection unit 1240 obtains a capturing condition for the face in the facial image extracted from the input image and a capturing condition for the face in the facial image extracted from the selected registered image.

In step S1306, an integration method control unit 1250 obtains, as a shooting condition variation, the difference between the capturing condition for the face in the facial image extracted from the input image and the capturing condition for the face in the facial image extracted from the selected registered image.

In step S1307, the integration method control unit 1250 selects local degrees of similarity in a number decided in accordance with the shooting condition variation from the higher rank in descending order of local degrees of similarity obtained in step S1304.

In step S1308, a degree-of-similarity integration unit 1230 obtains one degree of similarity from the degrees of similarity selected in step S1307.

Feature extraction processing of step S1302 and the local feature extraction unit 1210 that executes the processing will be described next. The local feature extraction unit 1210 extracts a plurality of local feature amounts necessary to identify an individual from a facial image. First, the local feature extraction unit 1210 sets, in a facial image, a plurality of local regions used to extract local feature amounts. The local regions can have arbitrary sizes, shapes, and positions. For example, rectangular regions having almost the same sizes as organs such as an eye and a mouth, which represent the features of an individual well, are set so as to overlap the organs. Fixed coordinates common to all facial images can be used as the coordinates to set the rectangular regions. However, the organs do not necessarily fit in the rectangular regions depending on the face orientation or face shape with an individual difference. Hence, the positions of the face organs such as an eye, a nose, and a mouth are detected using face organ detection described in, for example, T. F. Cootes, C. J. Taylor, D. Cooper, and J. Graham, "Active Shape Models—Their Training and Application", 1998. A local region is set with respect to each detected organ position as the center. To set a local region at a portion other than the face organs, the following processing is performed. A line segment that connects the positions of two face organs is obtained, and a local region is set with respect to a position where the line segment is divided at a predetermined ratio as the center. With this method, the local regions can be set at appropriate positions independently of the relative positional relationship between face organs which changes depending on the age or individual difference.

Next, the local feature extraction unit 1210 extracts a local feature amount from each of the set local regions. A luminance value in each local region of the facial image may directly be extracted as the local feature amount. However, the luminance values are readily affected by the difference between illumination conditions or the like and are therefore not suitable for identification. When image conversion such as LBP conversion (T. Ahonen, A. Hadid, and M. Pietikainen, "Face Recognition with Local Binary Patterns", 1994) is performed for the facial image, the overall variation in the illumination condition can be absorbed. For further information about LBP conversion, see the literature. Only an outline will be described below. In LBP conversion, the pixel value of a pixel of an image is compared with that of at least one of eight pixels adjacent to the pixel so as to compare the luminances. The comparison results are assigned from the higher rank to the lower rank in the upper bit depth direction in a predetermined order, thereby obtaining a pixel value quantized to 8 bits at maximum as a pixel value after conversion. The outline of LBP conversion has been described above. A vector formed by sequentially extracting and arranging pixel values obtained by LBP conversion of a luminance image in a local region by the above-described processing is extracted as a local feature amount.

Degree-of-similarity calculation processing of step S1304 and the local degree-of-similarity calculation unit 1220 that executes the processing will be described next. In step S1304, the degree of similarity (local degree of similarity) between corresponding local feature amounts out of the plurality of local feature amounts extracted from the input image (facial image) and the plurality of local feature amounts extracted from the selected registered image (facial image) is obtained, as described above. Various methods are considerable to obtain a local degree of similarity. Any method is usable if the higher the degree of similarity is, the more similar the local feature amounts are. For example, there are a method of calculating the cosine value of the angle made by the vectors of local feature amounts as a local degree of similarity and a method of calculating the reciprocal of the Euclidean distance between the vectors of local feature amounts as a local degree of similarity.

Shooting condition detection processing of step S1305 and the shooting condition detection unit 1240 that executes the processing will be described next. In step S1305, a capturing condition for the face in the facial image extracted from the input image and a capturing condition for the face in the facial image extracted from the selected registered image are obtained, as described above. The "rotation angle (pan angle) of a face in the depth direction" will be used below as a "shooting condition". In the following description, the "rotation angle of a face in the depth direction" will simply be referred to as a face angle.

Various methods are considerable to detect the face angle from an image. For example, a method described in Y. Li, S. Gong, J. Sherrah, and H. Liddell, "Support vector machine based multi-view face detection and recognition", 2004 or the like is used. For further information about the method, see the literature. Only an outline will be described below. To extract information capable of determining a face orientation from a facial image while excluding the individual difference and the illumination condition, edges are detected using vertical and horizontal Sobel filters, and the intensity images of the edges are obtained as feature amounts. The feature amounts are input to a support vector machine learned in advance, and regressed to the face angle. Note that the method of obtaining a numerical value as the face angle has been described above. However, a method of more roughly outputting a coarse class such as right, left, or front may be used.

Figure 6:
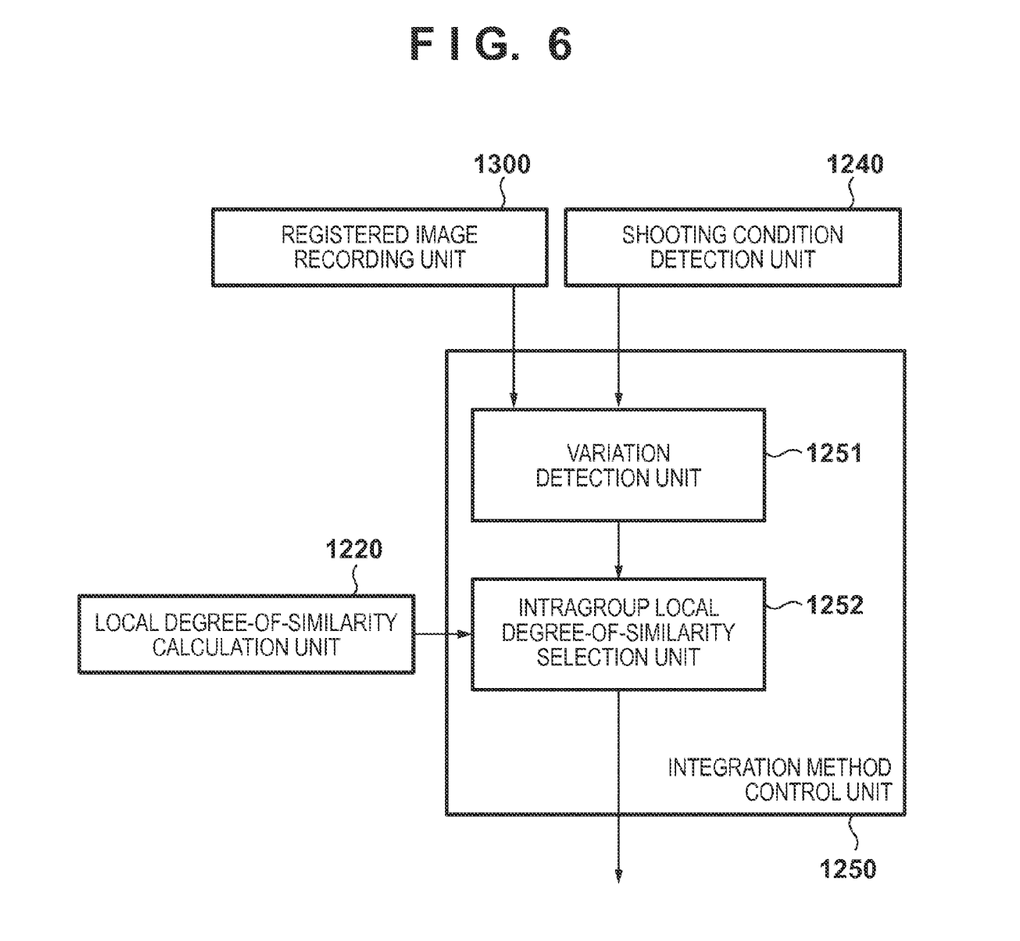
FIG. 6 is a block diagram showing an example of the functional arrangement of an integration method control unit 1250.

Processing of detecting a shooting condition variation in step S1306 and the integration method control unit 1250 that executes the processing will be described next. FIG. 6 shows an example of the functional arrangement of the integration method control unit 1250. The processing of step S1306 is performed by a variation detection unit 1251.

The variation detection unit 1251 obtains, as a shooting condition variation, the difference between the capturing condition for the face in the facial image extracted from the input image and the capturing condition for the face in the facial image extracted from the selected registered image. Since the face angle is used as the shooting condition, as described above, the variation detection unit 1251 obtains the difference between the face angles. Note that the "difference between the face angles" is the absolute value of the difference between the face angle of the face in the facial image extracted from the input image and the face angle of the face in the facial image extracted from the selected registered image.

Integration method control processing of step S1307 and the integration method control unit 1250 that executes the processing will be described next. The processing of step S1307 is performed by an intragroup local degree-of-similarity selection unit 1252.

The intragroup local degree-of-similarity selection unit 1252 selects at least one local degree of similarity as an integration target out of the local degrees of similarity obtained by the local degree-of-similarity calculation unit 1220. However, instead of directly deciding the local degree of similarity as the integration target out of the degrees of similarity obtained by the local degree-of-similarity calculation unit 1220, the local degree of similarity is indirectly decided by deciding the ratio of local degrees of similarity to be used in descending order of local degree of similarity based on the difference between the face angles.

More specifically, local degrees of similarity in a number (ratio decided in accordance with the difference between the face angles×number of local degrees of similarity obtained by the local degree-of-similarity calculation unit 1220) decided in accordance with the difference between the face angles are selected as the integration targets from the higher rank in descending order of local degrees of similarity obtained by the local degree-of-similarity calculation unit 1220.

The advantage of indirectly deciding use/disuse (integration target/non-integration target) of each local degree of similarity based on the relative order of the local degrees of similarity is as follows. The magnitude of a local degree of similarity itself serves as an index to detect whether the local region is unsuitable for identification because of a variation on the facial image. There is also a method of separately detecting the degree of reliability for each local region (for example, Japanese Patent Laid-Open No. 2007-128262). However, a method of directly handling the collation result of a local feature amount as the degree of reliability of the local region, as in this embodiment, can be considered to be more robust.

In this embodiment, when the difference between the face angles is small, that is, the apparent change between facial images is small, the ratio of local degrees of similarity to be selected as the integration targets out of the local degrees of similarity obtained by the local degree-of-similarity calculation unit 1220 is set high. This is based on the fact that the number of local regions affected by a variation caused by the difference between face orientations is considered to be small in the whole. Conversely, when the difference between the face angles is large, that is, the apparent change between facial images is large, the ratio of local degrees of similarity to be selected as the integration targets out of the local degrees of similarity obtained by the local degree-of-similarity calculation unit 1220 is set low. This is because the number of local regions affected by a variation caused by the difference between face orientations is considered to be large in the whole. The specific relationship between the ratio and the face orientation difference cannot be uniquely decided because of the influence of the local feature amount extraction method and the number, sizes, and positions of local regions. However, the relationship is required to be adjusted in advance before implementation of the apparatus.

Degree-of-similarity integration processing of step S1308 and the degree-of-similarity integration unit 1230 that executes the processing will be described next. The degree-of-similarity integration unit 1230 derives one degree of similarity from the degrees of similarity selected in step S1307. Various methods are considerable to derive the one degree of similarity. For example, the average value of the degrees of similarity selected in step S1307 is derived as the "one degree of similarity". As another method, a method using a support vector machine is considerable. Learning is performed in advance using a number of learning data so as to identify a local-degree-of-similarity group obtained between the facial images of a single person and a local-degree-of-similarity group obtained between the facial images of different persons. An output value obtained by inputting the local-degree-of-similarity groups to the support vector machine can be handled as the "one degree of similarity".

<Modification>

In the first embodiment, the description has been made assuming that registered images themselves are registered in the registered image recording unit 1300. However, not the registered images but the capturing condition (face angle in the above case) for the face in the facial image of a registered image or a plurality of local feature amounts in the facial image may be registered in the registered image recording unit 1300. This makes it possible to omit the processing of obtaining the capturing condition for the face in the facial image of a registered image or a plurality of local feature amounts in the facial image in the flowchart of FIG. 5.

Second Embodiment

In the first embodiment, only the absolute value of the difference between the face angles is obtained as the shooting condition variation. In the first embodiment, how the respective two face angles are is not taken into consideration for the same face angle difference. In this embodiment, one final degree of similarity is obtained in consideration of the difference between face angles and the two angles.

Figure 7:
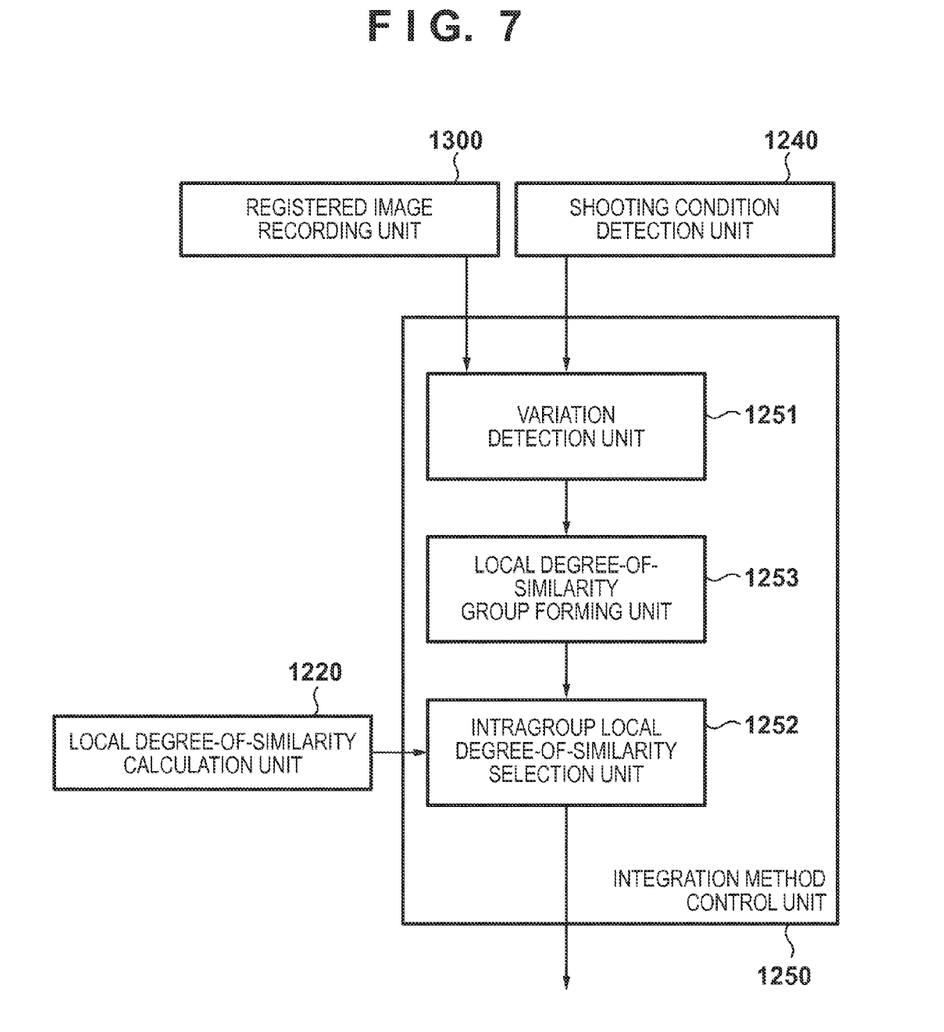
FIG. 7 is a block diagram showing an example of the functional arrangement of an integration method control unit 1250.

In this embodiment, integration method control processing of step S1307 and the functional arrangement of an integration method control unit 1250 that executes the processing are different from the first embodiment, and the rest is the same as in the first embodiment. Integration method control processing of step S1307 according to this embodiment and an example of the functional arrangement of the integration method control unit 1250 that executes the processing will be described below. FIG. 7 shows an example of the functional arrangement of the integration method control unit 1250 according to this embodiment. The arrangement shown in FIG. 7 is obtained by adding a local degree-of-similarity group forming unit 1253 to the arrangement shown in FIG. 6.

Figure 8:
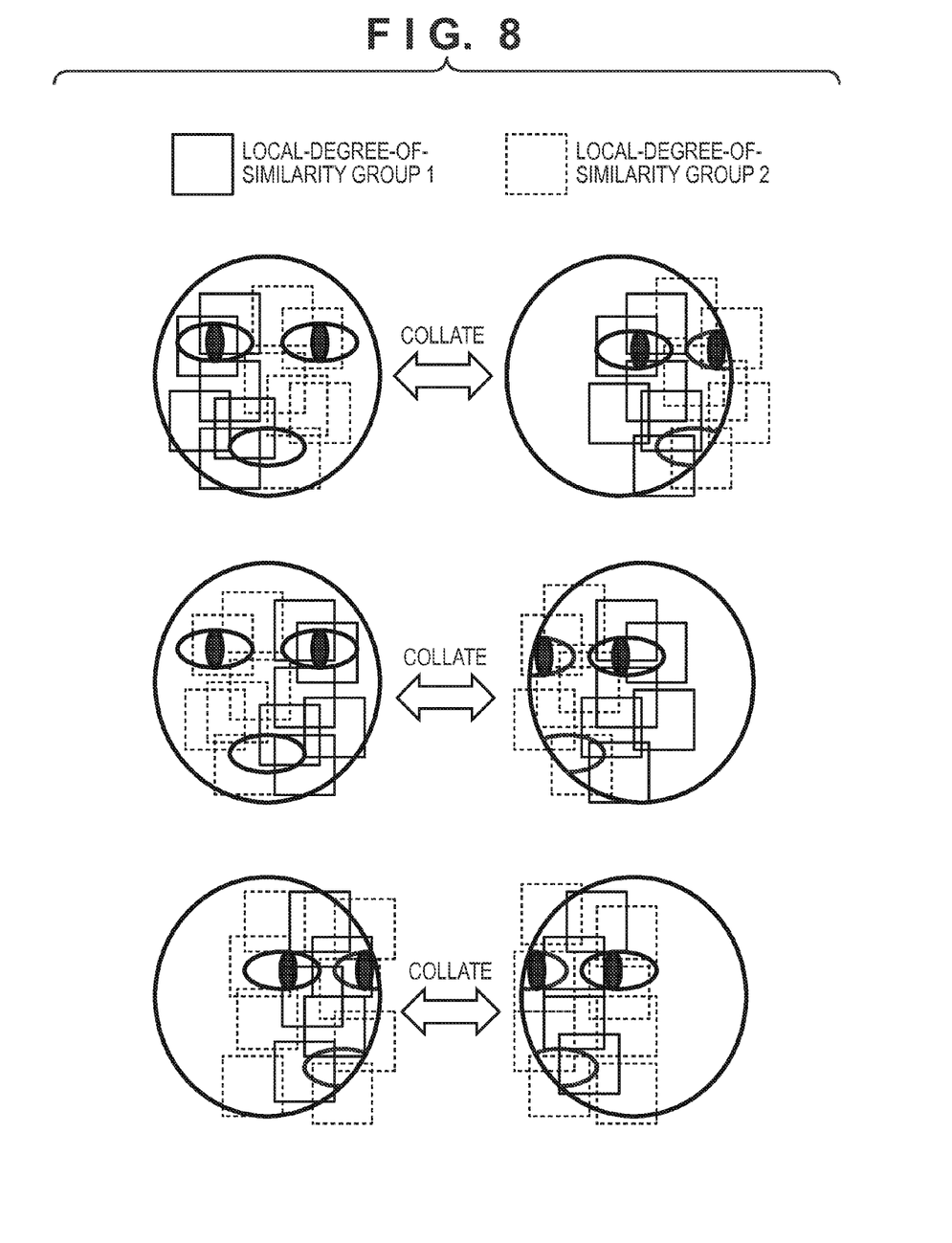
FIG. 8 is a schematic view of grouping of face orientations.

The local degree-of-similarity group forming unit 1253 divides local degrees of similarity into groups in accordance with the face angles of a registered image and an input image. In this embodiment, an example of grouping based on the positions of local regions where local degrees of similarity are obtained will be described. FIG. 8 is a schematic view of grouping of face orientations. In the examples at the upper and middle stages of FIG. 8, local degrees of similarity are divided into local-degree-of-similarity group 1 on the near side of the angle of view and local-degree-of-similarity group 2 on the far side of the angle of view. In the example at the lower stage of FIG. 8, since the face orientations oppose each other, local degrees of similarity at the center of the face are divided into local-degree-of-similarity group 1, and local degrees of similarity on a side surface of the face are divided into local-degree-of-similarity group 2. Which local degree of similarity belongs to which group at which face angle cannot be uniquely decided because of the influence of the local feature amount extraction method and the number, sizes, and positions of local regions. However, it is required to be adjusted in advance before implementation of the identification apparatus.

An intragroup local degree-of-similarity selection unit 1252 decides, for each local-degree-of-similarity group, the ratio of local degrees of similarity to be used as integration targets out of the local degrees of similarity classified into the local-degree-of-similarity group. Typically, the ratio is set rather high for local-degree-of-similarity group 1 on the near side of the angle of view because the apparent change between facial images is small. Conversely, the ratio is set rather low for local-degree-of-similarity group 2 because the apparent change between facial images is large on the far side of the angle of view. The optimum ratio in each group cannot be uniquely decided because of the influence of the local feature amount extraction method and the number, sizes, and positions of local regions. Hence, the ratio is required to be adjusted in advance before implementation of the identification apparatus.

As described above, according to this embodiment, not only the face angles but also information representing how the orientations of two faces are is used. Since portions where the apparent change between images is considered to be large depending on the difference between the face orientations and portions where the change is considered to be small can be estimated using the information, the local regions are explicitly classified into groups in accordance with the portions. Since the integration ratio can be adjusted independently in each explicitly classified group, the effect of more robustly identifying an individual based on the difference between face orientations can be expected.

A degree-of-similarity integration unit 1230 according to this embodiment and degree-of-similarity integration processing (step S1308) executed by the degree-of-similarity integration unit 1230 will be described next. In this embodiment, the ratio is decided for each group, as described above. Hence, for each group, the local degrees of similarity as the integration targets in the group are decided, as in the first embodiment. One final degree of similarity is obtained from the local degrees of similarity as the integration targets decided for each group.

For example, a method is usable in which using a local degree-of-similarity group G1 of the integration target in local-degree-of-similarity group 1 and a local degree-of-similarity group G2 of the integration target in local-degree-of-similarity group 2, $$\text{similarity} = \Sigma_{g \in G1 \cup G2} g/(N1+N2) \quad (1)$$

is calculated, thereby obtaining the average of the local degree-of-similarity groups as the one final degree of similarity. However, when the number N1 of local degree-of-similarities and the number N2 of local degree-of-similarities have a large difference between G1 and G2, the final result greatly depends on the local degrees of similarity of the local degree-of-similarity group including a larger number of local degrees of similarity. Hence, $$\text{similarity} = (\Sigma_{g \in G1} g/N1 + \Sigma_{g \in G2} g/N2)/2 \quad (2)$$

in which the influence of the number of local degrees of similarity is normalized may be used in place of equation (1).

Third Embodiment

In this embodiment, the difference between illumination conditions when shooting faces will be exemplified as a shooting condition variation. Especially, the direction of a light source will be explained as the difference between illumination conditions. The contents of processing performed in this case will be described below. Note that the differences from the first and second embodiments will mainly be explained below. That is, the rest is the same as in the first and second embodiments unless otherwise specified.

Processing (feature extraction processing of step S1302) performed by a local feature extraction unit 1210 will be described first. In the first embodiment, an image that has undergone LBP conversion is used, as described above. In this embodiment, another feature amount is additionally extracted and used as a local feature amount. In the LBP conversion described in the first embodiment, variations in the entire luminance values, that is, variations generated between a face that is bright as a whole and a face that is dark as a whole can be absorbed using the luminance value relationship between adjacent pixels. However, when illuminated from a specific direction, shading of a face varies is the direction of the light source changes. This is a local variation in the luminance value and affects the LBP conversion. Since different LBP images are obtained from the same person by conversion, the LBP conversion is unsuitable for individual identification. In this case, a method such as HOG conversion (see Navneet Dalal and Bill Triggs, "Histograms of Oriented Gradients for Human Detection", 2005) is used. For further information about HOG conversion, see the literature. Only an outline will be described below.

First, an image is divided into small rectangular regions. For each rectangular region, a histogram is created by totalizing gradient amounts in the respective directions included in the rectangular region. After the area of the histogram is normalized, vectors connected to the histograms of the rectangular regions are calculated as feature amounts. In HOG conversion, since images are totalized as histograms, information of a position or shape does not remain, and information expressing an individual difference decreases. However, since relationships other than those between adjacent pixels are also used, and the gradient amounts are normalized, feature amounts robust to a local variation in illumination are obtained. On the other hand, since LBP feature amounts strictly leave images unchanged, the shapes and positions of face organs such as an eye and a mouth expressing an individual difference remain. Hence, the LBP feature amounts are considered to include a large quantity of information expressing an individual difference, although they have a characteristic to be readily affected by a local variation in illumination, as described above.

The two types of feature amounts may be extracted from one local region by using the same local region as a local region to extract an LBP feature amount and a local region to extract a HOG feature amount. However, these types of feature amounts may be extracted from different local regions.

In this embodiment as well, the degree of similarity between corresponding local feature amounts is calculated as a local degree of similarity in step S1304. At this time, the degree of similarity is obtained between local feature amounts of the same type, as a matter of course.

Processing (shooting condition detection processing of step S1305) performed by a shooting condition detection unit 1240 will be described next. Here, a shooting condition is detected from an input image (registered image). Especially in this embodiment, the angle of the direction of a light source that illuminates a face is detected. In this embodiment, the direction of the light source will simply be referred to as an illumination angle hereinafter.

An arbitrary method is usable to detect the illumination angle from a facial image. For example, detection can be done using the following method. First, a facial image is reduced to a low resolution. The facial image is required to be reduced to a level at which details of an eye, a mouth, and the like disappear, and the individual becomes unidentifiable but the shade and sidelight of the face are barely confirmable. Next, the pixel values of the reduced facial image are arranged and regarded as a vector. The vector is projected to a subspace obtained in advance by principal component analysis. This projected vector is attribute information representing the illumination state of the face. Note that the subspace is formed by collecting a number of facial images illuminated with light from various directions and performing principal component analysis using the facial images as learning data. Typically, several characteristic vectors corresponding to several vectors having particularly large eigenvalues can express the illumination angle in the subspace.

Processing (variation detection processing of step S1306) performed by an integration method control unit 1250 (variation detection unit 1251) will be described next. The variation detection unit 1251 obtains, as a shooting condition variation, the difference between the capturing condition for the face in the facial image extracted from the input image and the capturing condition for the face in the facial image extracted from the selected registered image. Since the illumination angle is used as the shooting condition, as described above, the variation detection unit 1251 obtains the difference between the illumination angles. Note that the "difference between the illumination angles" is, for example, the difference between the vector of the illumination angle in the facial image extracted from the input image and the vector of the illumination angle in the facial image extracted from the selected registered image, or the cosine of the angle made by the vectors.

Processing (integration method control processing of step S1307) performed by the integration method control unit 1250 (local degree-of-similarity group forming unit 1253 and intragroup local degree-of-similarity selection unit 1252) will be described next.

The local degree-of-similarity group forming unit 1253 divides local degrees of similarity into groups. In this embodiment, an example of grouping local regions based on the difference between the types of local feature amounts will be described. The local degrees of similarity are divided into local-degree-of-similarity group 1 that collates the LBP feature amounts and local-degree-of-similarity group 2 that collates the HOG feature amounts.

The intragroup local degree-of-similarity selection unit 1252 decides, for each local-degree-of-similarity group, the ratio of local degrees of similarity to be used for integration. As described above, the LBP feature amounts include a large quantity of information expressing an individual difference but are readily affected by a local variation in illumination. Additionally, although the HOG feature amounts are robust to a local variation in illumination, information expressing an individual difference decreases because of histograms, as described above. In this embodiment, when the difference between the illumination angles is small, that is, when shades are applied in similar manners on the facial images, and the local variation in illumination is small, the ratio of the degrees of similarity of the LBP feature amounts to be used as the integration targets is set high, and the ratio of the degrees of similarity of the HOG feature amounts is set low. This aims at performing identification by feature amounts expressing an individual difference better because the possibility that the LBP feature amounts are affected by the local variation in illumination is low. Conversely, when the difference between the illumination angles is large, that is, when shades are applied in different manners on the facial images, and the local variation in illumination is large, the ratio of the degrees of similarity of the LBP feature amounts to be used as the integration targets is set low, and the ratio of the degrees of similarity of the HOG feature amounts is set high. This aims at maintaining the identification accuracy by using not the LBP feature amounts that can hardly identify an individual because of the influence of the variation in illumination but the HOG feature amounts that include little information expressing an individual difference but are robust to the variation in illumination. The specific relationship between the difference between the illumination angles and the ratio of integration of the degrees of similarity cannot be uniquely decided because of the influence of the types, numbers, sizes, and positions of local feature amounts. However, the relationship is required to be adjusted in advance before implementation of the identification apparatus.

In this embodiment, according to the difference between the illumination conditions, local degrees of similarity collated using a plurality of feature amounts are classified into groups depending on the difference between the types of feature amounts. As another example, according to the difference between the illumination conditions, the integration ratio of a single local-degree-of-similarity group can also be adjusted, as in the first embodiment. When obtaining the local degrees of similarity using only LBP feature amounts, only local degrees of similarity that are not affected by the variation can be used by lowering the ratio of local degrees of similarity to be used for integration if the difference between the illumination angles is large. However, the ratio of local degrees of similarity to be used for integration may be considerably small. In this case, local degrees of similarity enough to identify an individual cannot be obtained, and only a limited effect is considered to be obtained. As still another example, local degrees of similarity of LBP feature amounts and HOG feature amounts are obtained using these feature amounts. The ratio of local degrees of similarity to be integrated can be adjusted in a single local-degree-of-similarity group without classifying the local degrees of similarity into groups. However, the LBP feature amounts and the HOG feature amounts have different characteristics, as described above, and compensate for each other. For this reason, if ratio adjustment of LBP and HOG feature amounts is similarly performed in accordance with the difference between the illumination angles, it may be impossible to exploit the characteristics to compensate for each other, and only a limited effect is considered to be obtained.

Note that the above-described embodiments and modification are merely examples or examples of a basic arrangement to be described below. According to the basic arrangement, an image processing apparatus for identifying an object in an input image obtains (calculates) the degree of similarity between corresponding local feature amounts out of a plurality of local feature amounts of the object in the input image and a plurality of local feature amounts of an object in a registered image registered in advance. At least one degree of similarity is selected out of the degrees of similarity obtained by the calculation in accordance with a capturing condition for the object in the input image and a capturing condition for the object in the registered image. One degree of similarity is derived from the at least one selected degree of similarity. It is determined based on the one derived degree of similarity whether the object in the input image belongs to the same category as the object in the registered image.

All the units shown in FIGS. 1, 4, 6, and 7 can be formed from hardware. However, the registered image recording unit 1300 may be formed from a memory, and the remaining units may be implemented by software (computer programs). In this case, the computer programs are stored in a memory provided in a PC (Personal Computer) or the like, and the memory corresponding to the registered image recording unit 1300 is incorporated in the computer. When a processor such as a CPU of the computer executes processing using the computer programs, the computer executes processes described above as processes to be performed by the object identification apparatus 1000 (processes of the flowcharts of FIGS. 2, 3, and 5).

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-246671, filed Nov. 28, 2013 which is hereby incorporated by reference herein in its entirety.

What is claimed is:
1. An image processing apparatus for identifying an object in an input image, comprising:
   a memory; and
   a processor which executes a program stored in the memory to function as:
   a calculation unit configured to obtain a degree of similarity between corresponding local feature amounts out of a plurality of local feature amounts of the object in the input image and a plurality of local feature amounts of an object in an image registered in advance;

an obtaining unit configured to obtain a difference between a capturing condition for the object in the input image and a capturing condition for the object in the registered image;

a selection unit configured to select, from degrees of similarity obtained by the calculation unit, degrees of similarity in a number according to the difference from a higher rank in descending order of the degree of similarity, wherein the selection unit selects a smaller number of degrees of similarity as the difference becomes larger;

a derivation unit configured to derive one degree of similarity from the selected degrees of similarity; and a determination unit configured to determine, based on the one degree of similarity derived by the derivation unit, whether the object in the input image belongs to the same category as the object in the registered image.

2. The apparatus according to claim 1, wherein the determination unit outputs information representing the category to which, out of objects in a plurality of registered images, the object having the one degree of similarity not less than a threshold and corresponding to a maximum degree of similarity belongs as an identification result of the object in the input image.

3. The apparatus according to claim 1, wherein the derivation unit obtains an average value of the at least one selected degree of similarity as the one degree of similarity.

4. The apparatus according to claim 1, wherein the capturing condition includes an angle of capturing the object.

5. The apparatus according to claim 1, wherein the capturing condition includes a direction of a light source which illuminates the object.

6. The apparatus according to claim 1, wherein the selection unit determines the number of degrees of similarity based on a ratio according to the difference and a total number of degrees of similarity obtained by the calculation unit.

7. An image processing apparatus for identifying an object in an input image, comprising:

a memory; and a processor which executes a program stored in the memory to function as:

a calculation unit configured to obtain a degree of similarity between corresponding local feature amounts out of a plurality of local feature amounts of the object in the input image and a plurality of local feature amounts of an object in an image registered in advance;

a classification unit configured to classify degrees of similarity between the local feature amounts obtained by the calculation unit into groups preset based on a capturing condition for the object in the input image and a capturing condition for the object in the registered image with respect to positions of the respective local feature amounts in the input image and the registered image;

a selection unit configured to select, out of the degrees of similarity classified into each of the groups, the degrees of similarity in a number according to a ratio preset for the group from a higher rank in descending order of the degree of similarity; and a derivation unit configured to derive one degree of similarity from the degrees of similarity selected in respective groups; and a determination unit configured to determine, based on the one degree of similarity derived by the derivation unit, whether the object in the input image belongs to the same category as the object in the registered image.

8. The apparatus according to claim 7, wherein the capturing condition includes an angle of capturing the object.

9. An image processing apparatus for identifying an object in an input image, comprising:

a memory; and a processor which executes a program stored in the memory to function as:

a calculation unit configured to obtain a degree of similarity between corresponding local feature amounts out of a plurality of local feature amounts of the object in the input image and a plurality of local feature amounts of an object in an image registered in advance;

an obtaining unit configured to obtain a difference between a capturing condition for the object in the input image and a capturing condition for the object in the registered image;

a classification unit configured to classify degrees of similarity between the local feature amounts obtained by the calculation unit into groups according to types of the local feature amounts;

a selection unit configured to select, from the degrees of similarity classified into each of the groups, the degrees of similarity in a number decided in accordance with the group and the difference from a higher rank in descending order of the degree of similarity;

a derivation unit configured to derive one degree of similarity from the degrees of similarity selected in respective groups; and a determination unit configured to determine, based on the one degree of similarity derived by the derivation unit, whether the object in the input image belongs to the same category as the object in the registered image.

10. The apparatus according to claim 9, wherein the capturing condition includes a direction of a light source which illuminates the object.

11. An image processing method, comprising:

an image processing apparatus for identifying an object in an input image, using a processor to perform:

a calculation step of obtaining a degree of similarity between corresponding local feature amounts out of a plurality of local feature amounts of the object in the input image and a plurality of local feature amounts of an object in an image registered in advance;

an obtaining step of obtaining a difference between a capturing condition for the object in the input image and a capturing condition for the object in the registered image:

a selection step of selecting, from degrees of similarity obtained by the calculation, degrees of similarity in a number according to the difference from a higher rank in descending order of the degree of similarity, wherein the selection step selects a smaller number of degrees of similarity as the difference becomes larger:

a derivation step of deriving one degree of similarity from the selected degrees of similarity;

and a determination step of determining, based on the one degree of similarity derived in the derivation step, whether the object in the input image belongs to the same category as the object in the registered image.

12. A non-transitory computer-readable storage medium storing a computer program that causes a computer to function as each unit of an image processing apparatus for identifying an object in an input image, comprising:
- a calculation unit configured to obtain a degree of similarity between corresponding local feature amounts out of a plurality of local feature amounts of the object in the input image and a plurality of local feature amounts of an object in an image registered in advance;
- an obtaining unit configured to obtain a difference between a capturing condition for the object in the input image and a capturing condition for the object in the registered image;
- a selection unit configured to select, from degrees of similarity obtained by the calculation unit, degrees of similarity in a number according to the difference from a higher rank in descending order of the degree of similarity, wherein the selection unit selects a smaller number of degrees of similarity as the difference becomes larger;
- a derivation unit configured to derive one degree of similarity from the selected degrees of similarity; and
- a determination unit configured to determine, based on the one degree of similarity derived by the derivation unit, whether the object in the input image belongs to the same category as the object in the registered image.

13. An image processing method, comprising: identifying an object in an input image, using at least one processor to perform:
- a calculation step of obtaining a degree of similarity between corresponding local feature amounts out of a plurality of local feature amounts of the object in the input image and a plurality of local feature amounts of an object in an image registered in advance;
- a classification step of classifying degrees of similarity between the local feature amounts obtained by the calculation step into groups preset based on a capturing condition for the object in the input image and a capturing condition for the object in the registered image with respect to positions of the respective local feature amounts in the input image and the registered image;
- a selection step of selecting, out of the degrees of similarity classified into each of the groups, the degrees of similarity in a number according to a ratio preset for the group from a higher rank in descending order of the degree of similarity; and
- a derivation step of deriving one degree of similarity from the degrees of similarity selected in respective groups; and
- a determination step of determining, based on the one degree of similarity derived by the derivation step, whether the object in the input image belongs to the same category as the object in the registered image.

14. A non-transitory computer-readable storage medium storing a computer program that causes a computer to function as each unit of an image processing apparatus for identifying an object in an input image, comprising:
- a calculation unit configured to obtain a degree of similarity between corresponding local feature amounts out of a plurality of local feature amounts of the object in the input image and a plurality of local feature amounts of an object in an image registered in advance;
- a classification unit configured to classify degrees of similarity between the local feature amounts obtained by the calculation unit into groups preset based on a capturing condition for the object in the input image and a capturing condition for the object in the registered image with respect to positions of the respective local feature amounts in the input image and the registered image;
- a selection unit configured to select, out of the degrees of similarity classified into each of the groups, the degrees of similarity in a number according to a ratio preset for the group from a higher rank in descending order of the degree of similarity; and
- a derivation unit configured to derive one degree of similarity from the degrees of similarity selected in respective groups; and
- a determination unit configured to determine, based on the one degree of similarity derived by the derivation unit, whether the object in the input image belongs to the same category as the object in the registered image.

15. An image processing method, comprising:
identifying an object in an input image, using at least one processor to perform:
- a calculation step of obtaining a degree of similarity between corresponding local feature amounts out of a plurality of local feature amounts of the object in the input image and a plurality of local feature amounts of an object in an image registered in advance;
- an obtaining step of obtaining a difference between a capturing condition for the object in the input image and a capturing condition for the object in the registered image;
- a classification step of classifying degrees of similarity between the local feature amounts obtained by the calculation step into groups according to types of the local feature amounts;
- a selection step of selecting, from the degrees of similarity classified into each of the groups, the degrees of similarity in a number decided in accordance with the group and the difference from a higher rank in descending order of the degree of similarity;
- a derivation step of deriving one degree of similarity from the degrees of similarity selected in respective groups; and
- a determination step of determining, based on the one degree of similarity derived by the derivation step, whether the object in the input image belongs to the same category as the object in the registered image.

16. A non-transitory computer-readable storage medium storing a computer program that causes a computer to function as each unit of an image processing apparatus for identifying an object in an input image, comprising:
- a calculation unit configured to obtain a degree of similarity between corresponding local feature amounts out of a plurality of local feature amounts of the object in the input image and a plurality of local feature amounts of an object in an image registered in advance;
- an obtaining unit configured to obtain a difference between a capturing condition for the object in the input image and a capturing condition for the object in the registered image;
- a classification unit configured to classify degrees of similarity between the local feature amounts obtained by the calculation unit into groups according to types of the local feature amounts;
- a selection unit configured to select, from the degrees of similarity classified into each of the groups, the degrees of similarity in a number decided in accordance with the group and the difference from a higher rank in descending order of the degree of similarity;

a derivation unit configured to derive one degree of similarity from the degrees of similarity selected in respective groups; and a determination unit configured to determine, based on the one degree of similarity derived by the derivation unit, whether the object in the input image belongs to the same category as the object in the registered image.

* * * * *